United States Patent
Salonaho

(10) Patent No.: US 6,208,863 B1
(45) Date of Patent: Mar. 27, 2001

(54) HANDOVER IN A MOBILE COMMUNICATION SYSTEM HAVING A MULTILAYER RADIO COVERAGE

(75) Inventor: Oscar Salonaho, Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 08/981,625

(22) PCT Filed: Apr. 14, 1997

(86) PCT No.: PCT/FI97/00227

§ 371 Date: Dec. 16, 1997

§ 102(e) Date: Dec. 16, 1997

(87) PCT Pub. No.: WO97/39599

PCT Pub. Date: Oct. 23, 1997

(30) Foreign Application Priority Data

Apr. 16, 1996 (FI) .......................................... 961668

(51) Int. Cl.[7] .............................. H04Q 7/20; G01S 13/58
(52) U.S. Cl. ......................... 455/444; 455/441; 455/453; 342/109
(58) Field of Search ................................. 455/437, 441, 455/444, 453, 449, 525; 342/109, 107; 370/331

(56) References Cited

U.S. PATENT DOCUMENTS

| | | | |
|---|---|---|---|
| 5,262,263 | * 11/1993 | Ohkawa et al. | 430/66 |
| 5,396,645 | * 3/1995 | Huff | 455/33.4 |
| 5,513,380 | * 4/1996 | Ivanov et al. | 455/33.2 |
| 5,678,185 | * 10/1997 | Chia | 455/33.2 |
| 5,722,072 | * 2/1998 | Crichton et al. | 455/437 |
| 5,913,168 | * 6/1999 | Moreau et al. | 455/441 |

FOREIGN PATENT DOCUMENTS

| | | |
|---|---|---|
| 526 436 | 2/1993 | (EP) . |
| 0 589 278 A3 | 3/1994 | (EP) . |
| 589 279 | 3/1994 | (EP) . |
| 701 382 | 3/1996 | (EP) . |
| 2 240 696 | 8/1991 | (GB) . |
| WO 92/01950 | 2/1992 | (WO) . |

OTHER PUBLICATIONS

Steele et al: "Teletraffic performance of microcellular personal communication networks", IEEE Proceedings–I, vol. 139, No. 4, Aug. 1992, pp. 448–461.

* cited by examiner

Primary Examiner—Edward F. Urban
Assistant Examiner—Sheila Smith
(74) Attorney, Agent, or Firm—Pillsbury Madison & Sutro

(57) ABSTRACT

The present invention relates to a handover method in a mobile communication system having a multilayer radio coverage, the system comprising at least one microcell (1, 2, 3) and at least one macrocell (M). The coverage area of the microcell (1, 2, 3) is at least mainly within the coverage area of the macrocell (M), the microcell layer forming a lower cell layer and the macrocell layer forming a higher cell layer. A cell to be examined and a target cell are located at different cell layers in the mobile communication system. In the method, relative moving speeds of mobile stations (MS) in the service area of a cell at the lower cell layer are determined and a traffic load in a cell at the higher cell layer is monitored. The handover method of the invention is characterized in that in the method the service times are determined in the service area of the cell at the lower cell layer, a percentage P of the number of the service times restricted by a specific pre-set threshold service time R in a selected service time material is determined, a percentage of all the mobile stations (MS) within the service area of the cell to be examined is handed over to the target cell in the order of the relative moving speed, and the pre-set threshold service time R is adjusted to attain a desired traffic load level in the cell at the upper cell layer.

11 Claims, 2 Drawing Sheets

HANDOVER IN A MOBILE COMMUNICATION SYSTEM HAVING A MULTILAYER RADIO COVERAGE

FIELD OF THE INVENTION

The present invention relates to a handover method in a mobile communication system of a multilayer radio coverage comprising a lower cell layer having at least one microcell and a higher cell layer having at least one macrocell, the microcell being at least mainly within the macrocell, the method comprising the steps of determining relative moving speeds of mobile stations in a first cell at the lower cell layer, and monitoring a traffic load in a second cell at the higher cell layer.

The invention also relates to a handover method from a microcell to a macrocell in a mobile communication system having a multilayer cell coverage comprising at least one microcell and at least one macrocell, whereby the microcell is within the macrocell, the method comprising steps of determining relative moving speeds of mobile stations in the service area of the microcell, and monitoring a traffic load in the macrocell.

BACKGROUND OF THE INVENTION

A radio coverage area in mobile communication systems is implemented with different cell sizes and often even with multilayer radio coverages of base stations. A cell having a very small coverage area, i.e. a microcell, is used for example in areas which are difficult to cover or require a high subscriber capacity. A larger coverage area is implemented with a macrocell, which often encompasses the geographical area of one or more microcells. In a multilayer radio coverage implemented in this way, macrocells represent coverage areas of a higher layer and microcells those of a lower layer. The mobile station may move from one cell to another and register with a new base station. When the mobile station has a call in progress, switching the call to the new cell is also involved, in which case switching to a new base station is referred to as handover.

FIG. 1 of the accompanying drawing discloses an example of a two-layer radio coverage in a mobile communication system. The simplified cell areas in FIG. 1 illustrate the areas where the base station of each cell can offer a sufficient signal level to the mobile station. In FIG. 1, a large macrocell M encompasses the areas of smaller microcells 1, 2 and 3. A mobile station MS located in position x within the microcell 1, for example, can in principle be served by the base station of either the macrocell M or the microcell 1.

In radio networks implemented with a multilayer radio coverage, it is advantageous to utilize the possibilities provided by the different cell layers by commanding the mobile stations, on the basis of some classification, to register with the most suitable base station, while also avoiding unnecessary handovers. One such classification principle is the speed of a mobile station in a mobile communication network having one or more microcells whose coverage areas are entirely inside another cell, typically a macrocell. It is known in the art that slow moving mobile stations are advantageously handed over to a base station of some microcell to prevent them from unnecessarily load the base station of the macrocell. On the other hand, it is advantageous to hand fast moving mobile stations over to the base station of the macrocell to prevent frequently recurring handovers and even to prevent calls from being lost when mobile stations move fast beyond the coverage area of the microcell.

FIG. 2 shows a simplified block diagram of the pan-European GSM mobile communication system. The units shown in FIG. 2 are present also in other mobile communication networks but they may have different names. A mobile station MS is connected over a radio path to one of base transceiver stations (BTS), such as BTS1 in FIG. 2. The mobile station MS constantly measures signals of the adjacent base stations for a possible handover. A base station system BSS comprises a base station controller BSC and base stations BTS under its control. Several base station controllers BSC generally operate under a mobile services switching centre MSC. The mobile services switching centre MSC is connected to other mobile services switching centres and via a gateway mobile services switching centre (GMSC) to a public switched telephone network. The operation of the whole system is supervised by an operation and maintenance centre OMC. Subscriber data of the mobile station MS is permanently stored in a home location register HLR and temporarily to a visitor location register VLR on whose area the mobile station MS is located at each time.

WO 95/28813 discloses a cellular mobile communication system where the time the mobile station is registered with a microcell is measured and the direction of travel of 0the mobile station is defined. A mobile station is indicated as being fast if the measured time in a cell is shorter than the pre-set time limit of this microcell and the entrance direction of the mobile station to the respective cell is different from the exit direction. In the prior art system, fast moving mobile stations are handed over to use a macrocell network. Handover from a microcell to a macrocell is carried out only if the mobile station has been found to be moving fast in several microcells. The slow speed of the handover decision is a problem with this solution. The mobile station has to pass through several microcells until a decision to carry out a handover to a macrocell can be made. During this time, the network is loaded with too frequent handovers from one microcell to another. A further problem is a possible blocking of a macrocell when all the mobile stations interpreted as being fast are handed over to the macrocell.

European Patent Application 0 589 278 discloses a microcell/macrocell system. This prior art system involves measuring the time a mobile station moving in a macrocell remains within a microcell inside the macrocell. The prior art system prevents fast moving mobile stations from being handed over to a base station of the microcell. Handover from the macrocell to the microcell is carried out only if the mobile station is still within the microcell after a predetermined time after its arrival in the microcell. If the mobile station has already departed from the microcell during the predetermined time, handover from the macrocell to the microcell will not be carried out. The slow speed of the handover decision is a problem with this solution, too. Handover decision can be made only after a predetermined time period after the mobile station has arrived in the microcell. After this time has passed, the mobile stations in the area of the microcell are interpreted as being slow and are handed over to a microcell although the mobile station would be just about to depart from the microcell. During the waiting time of the handover decision, the mobile station loads the macrocell. A problem with this solution is also an erroneous conception of the speed of a mobile station. The handover is affected only by the arrival of the mobile station in the microcell and by the location of the mobile station after a predetermined time from the arrival. During this time, a fast moving mobile station may have departed from the microcell and returned there, in which case the system carries out a handover from the macrocell to the microcell.

In one embodiment of the system, the measurement of time is stopped if the mobile station departs from the microcell, and it is started again from the beginning when the mobile station returns to the microcell area. The timer will be reset, for example, if the mobile station moves beyond the coverage area of a microcell momentarily, or if the measurement result is erroneous/missing, in which case the mobile station will not be recognized as being slow.

BRIEF DESCRIPTION OF THE INVENTION

An object of the present invention is to implement a fast and flexible handover decision for transferring a mobile station from one cell layer to another in a mobile communication system having a multilayer radio coverage.

This will be attained by a handover method, which is according to the invention characterized by further steps of determining the service times in the first cell at the lower cell layer, determining a percentage P of the number of the service times confined by a specific pre-set threshold service time R among a selected service time material, handing over the percentage P of all the mobile stations within the service area of the cell to be examined to the target cell in the order of the relative moving speed of the mobile stations, the cell to be examined being the first cell and the target cell being the second cell, or vice versa, and adjusting the pre-set threshold service time R to attain a desired traffic load level in the second cell at the upper cell layer.

The invention is based on the idea that a specific portion of all the mobile stations within the service area of the cell to be examined is handed over to a target cell at another cell layer on the basis of the moving speed of the mobile station. The number of the mobile stations to be handed over is determined by a long-term statistics on the time the mobile subscribers stay in a cell at a lower cell layer, i.e. a service time.

The advantage of the inventive handover from one cell layer to another is that a handover decision can be made fast.

A further advantage of the handover method of the invention is that an optimal utilization of the cell layer is attained in a flexible and effective manner and unnecessary handovers are avoided. The utilization of the cell layers can be adjusted easily and consistently. The handover method of the invention will adapt to changing traffic levels and varying speed distributions of mobile stations.

Another advantage of the invention is a simple and reliable handover criterion which is suitable for various cell sizes and also for networks having varying cell sizes. The use of the last statistical data on the service times in decision making increases the stability of the solution.

The invention also relates to a handover method as shown in the preamble from a microcell to a macrocell, which is characterized by further steps of determining the service times in the microcell, calculating a percentage P of the number of the service times shorter than a specific pre-set threshold service time R among a selected service time material, handing over the percentage P of all the mobile stations within the service area of the microcell to the macrocell in the order of the relative moving speed, starting from the fastest mobile station, and adjusting the pre-set threshold service time R to attain a desired traffic load level in the macrocell.

In addition to the advantages of the above handover method, an advantage of the handover method from a microcell to a macrocell is a handover criterion value which is easily adjustable and common to several cells.

In the handover method of the invention, the relative speeds and service times of mobile stations in the service area of a microcell at a lower cell layer are defined. The percentage P of the service times confined by a specific pre-set threshold service time R is calculated from the sample of the service times. The calculated percentage number of all the mobile stations currently present within the service area of the cell to be examined will be handed over to the target cell in the order of the relative moving speed of the mobile stations. The load in a cell at a higher cell layer is monitored continuously. When load deviates from the desired load level, the pre-set threshold service time R is changed so that the number of mobile stations to be handed over to the target cell will change into the desired direction.

In the handover method of the invention from a microcell to a macrocell, the relative speeds and service times of mobile stations in the service area of the microcell are defined. The percentage P of service times shorter than a specific pre-set threshold service time R is calculated from a sample of the service times. The calculated percentage P of all the mobile currently present within the service area of the microcell will be handed over to a macrocell in the order of the relative moving speed of the mobile stations, starting form the fastest mobile station. The load in the microcell is monitored. When load exceeds the maximum load level, the pre-set threshold service time R is decreased. When the load is smaller than the desired load level, the threshold service time R is appropriately increased.

BRIEF DESCRIPTION OF THE FIGURES

In the following, the invention will be described in greater detail with reference to the accompanying drawings, in which.

DETAILED DESCRIPTION OF THE INVENTION

Figure 2:
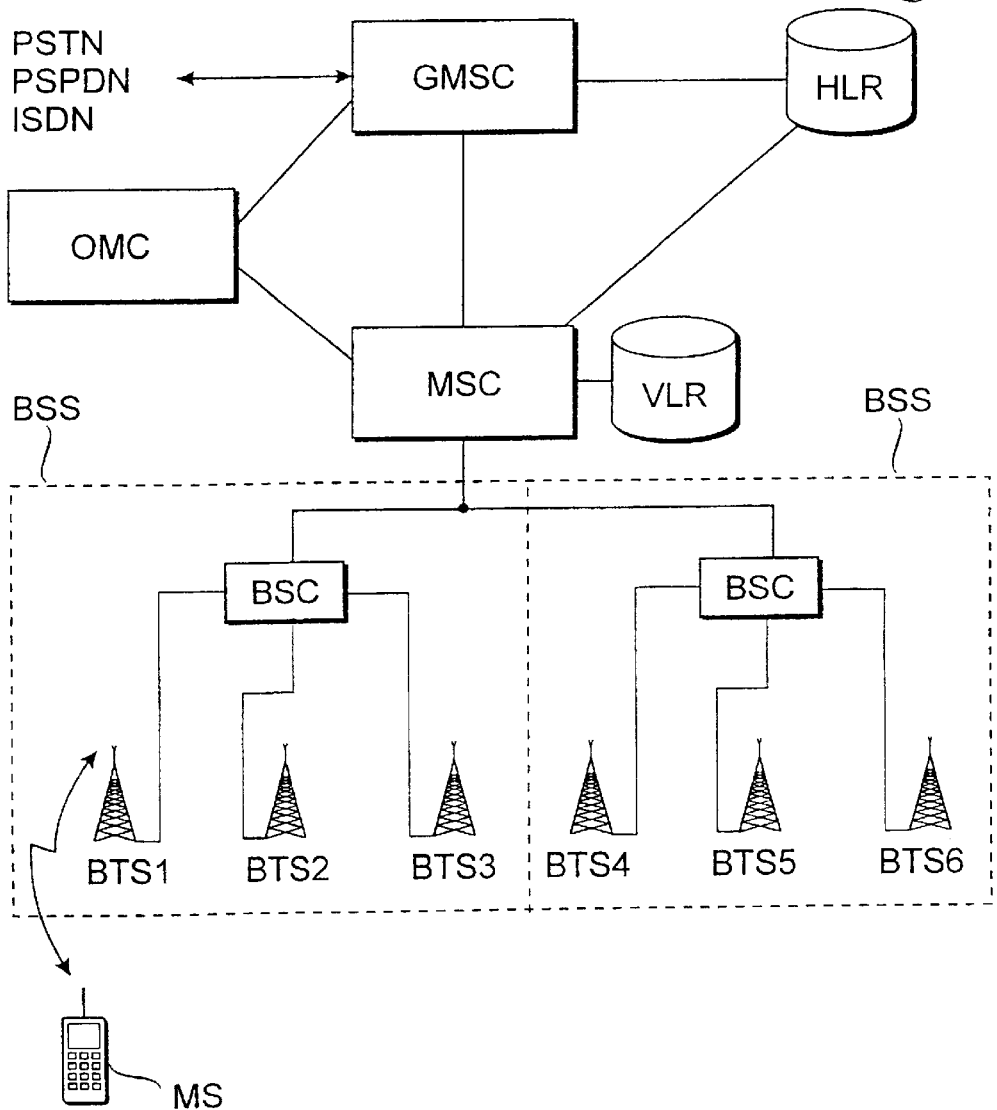
FIG. 2 is a block diagram of the structure of a mobile communication system.

The present invention can be applied in any cellular mobile communication system. In the following, the invention will be described in greater detail with reference, by way of example, to the pan-European digital mobile communication system GSM. FIG. 2 illustrates the above-described structure of a GSM network in a simplified manner. For a more accurate description of the GSM system, reference is made to the GSM recommendations and "The GSM System for Mobile Communications" by M. Mouly and M- B. Pautet, Palaiseau, France, 1992, ISBN: 2-9507190-0-7.

Figure 1:
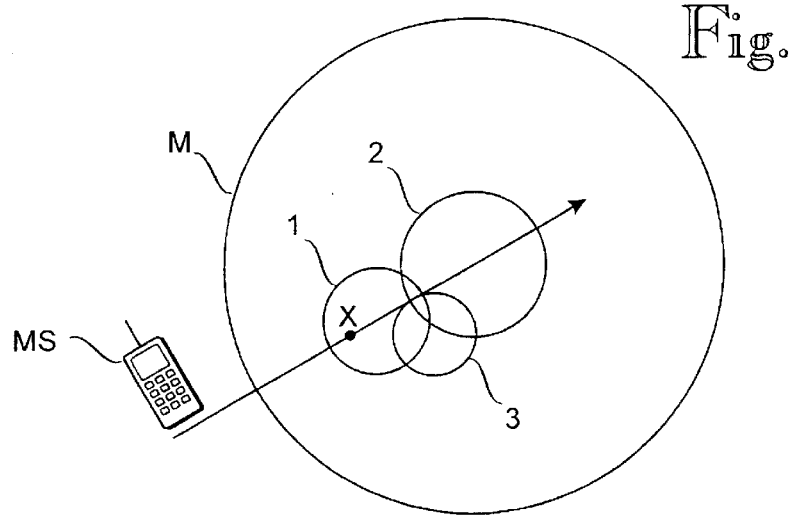
FIG. 1 illustrates a two-layer radio coverage of a mobile communication system.

The method of the invention is particularly applicable to microcell/-macrocell networks. FIG. 1 shows an example of a microcell/macrocell network having a two-layer radio coverage. The method is also suitable for use in other networks implemented with multilayer cell coverages, i.e. with more than two cell layers.

The handover method of the invention is most advantageous when mobile stations are handed over from the microcell layer to the macrocell layer, in which case the cell to be examined in the method is a microcell at a lower cell layer and the target cell is a macrocell at the higher cell layer.

In the following, the invention will be explained in more detail primarily in the light of this preferred embodiment.

Figure 3:
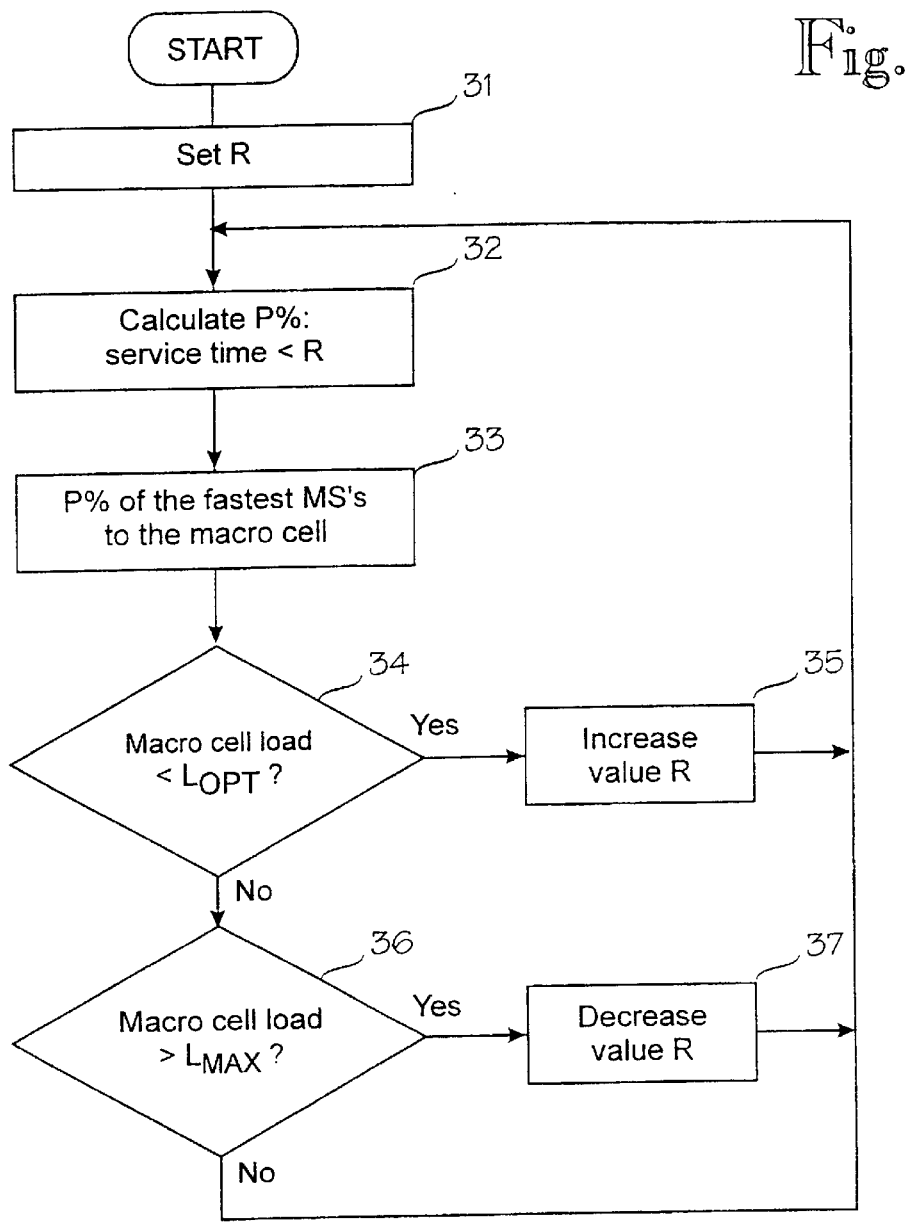
FIG. 3 is a flow chart of a preferred embodiment of the method of the invention.

FIG. 3 is a flow chart of a preferred embodiment of the method of the invention. In the method, the time a mobile station is located in the service area of microcell 1, 2 or 3 is measured for each mobile station MS. This service time will be determined on the basis of two consecutive handovers of the mobile station MS, for example. By the first handover, the mobile station MS enters the microcell 1 and by the second handover departs from the microcell 1 and will be served by the following cell. The handover criterion employed in these handovers is other than the handover criterion in the method of the invention. If the mobile station is handed over to the macrocell M on the basis of the handover criteria of the method of the present invention, the service time will be conceived as the time the mobile station MS would have been switched to the microcell 1 if handover to the macrocell M had not been carried out. In this case the service time will thus be determined by the time between the first handover of the mobile station MS to the microcell 1 and the mobile station MS departing from the service area of the microcell 1. Departure from the service area of the microcell is determined, for example, on the basis of normal base station signal measurements in the network. The measured service times are stored microcell-specifically into a continuously storing ring register. The service times measured during a specific time period or a specific number of last measured service times can be read from the ring register.

The criterion for a handover decision in the method is a pre-set threshold service time R (step 31 in FIG. 3). The threshold service time R is macrocell-specific and thus the same for all different sized microcells 1, 2 and 3 located within the area of the macrocell M. The percentage P of the service times which are shorter than the threshold service time R is calculated from the stored service times in the area of the microcell 1 (step 32). The calculation is carried out on a selected sample of service times. The selected sample of the service times may include the service times measured and stored during the last half-hour or the last stored hundred service time values. The length of the time period covered by the sample of the service times or the number of service times in the sample are selected to be appropriate for the purpose. The value P derived as the result of calculation indicates how many per cents of the mobile stations MS would have been served by the base station BTS of the microcell 1 for a shorter time than the threshold service time R during the last half-hour, for example, without the handover of the present invention. In step 33 the fastest mobile stations of the mobile stations currently engaged with the base station BTS of the microcell 1 are handed over one by one from the microcell 1 to the macrocell M. As a result, P% of all the mobile stations which are engaged or have been engaged with the base station BTS of the microcell 1 before the above-described handover of the invention will be engaged with the base station BTS of the macrocell M after the inventive handover. If the fastest P% of the mobile stations having been served by the microcell (still within the service area of the microcell 1) have already been handed over to the macrocell M, no new handovers of mobile stations will be carried out. The relative moving speed of the mobile stations MS in the service area of the microcell 1 is determined in any appropriate manner. Only ranking the mobile stations into an order of their speed is essential for determining the relative speed. It is not significant for the invention how this ranking of mobile stations according to their speed is attained. Some methods for determining the speed of the mobile station MS have been disclosed e.g. in WO 92/01950 and WO 97/00587.

The traffic load in the macrocell M is monitored in order that the network would not be blocked by handovers. In step 34 of FIG. 3, the load in the macrocell M is compared with a pre-set optimum load $L_{opt}$. If the load is smaller than the optimum $L_{opt}$, the value of the macrocell-specific threshold service time R is increased (step 35) so that a greater portion of the load in the microcells 1, 2 and 3 would be directed to the macrocell M. In step 36 the traffic load in the macrocell M is compared with a pre-set maximum load value $L_{max}$. If the maximum load $L_{max}$ is exceeded, the value of the threshold service time R is decreased to diminish the number of the mobile stations MS to be handed over (step 37). In the subsequent calculation of service times for the microcells 1, 2 and 3, the new threshold service time R will be used in place of the previously set threshold service time R. By adjusting one of the criterion parameters of the handover, here the threshold service time R, the threshold for handover from one cell layer to another can be commonly adjusted for several microcells 1, 2 and 3. When the load values $L_{opt}$ and $L_{max}$ are equal, a continuous adjustment of the threshold service time R is carried out in the inventive method. Some microcells can, when required, be assigned a dedicated microcell-specific threshold service time, by means of which the 30 macrocell-specific threshold service time R can be fine-adjusted.

Figure 4:
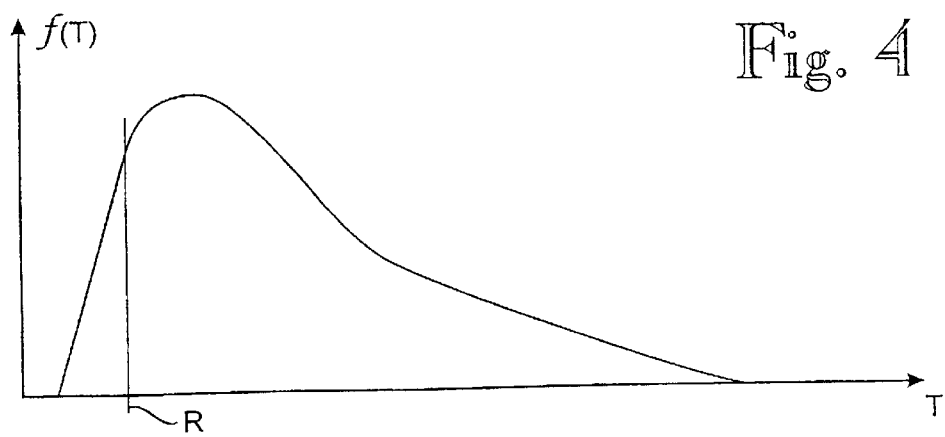
FIG. 4 shows an example of service time distribution in a cell.

FIG. 4 shows one service time distribution by way of example.

The horizontal axis of FIG. 4 represents the service time T and the vertical axis the probability density f(T). The threshold service time R is indicated by a vertical line in FIG. 4. The portion of the distribution graph shown on the left side of the vertical line R represents the proportion of the mobile stations whose service time is shorter than the threshold value R.

In mobile communication systems having more than two cell layers, the method can be applied by selecting the target cell from any one of the higher cell layers. All cell layers can be covered by chaining the use of the method in a desired manner.

When the method of the invention is applied to handover from a macrocell to a microcell, the principles are as in the above described handover from a microcell to a macrocell. When mobile stations are to be handed over from a higher cell layer to a lower cell layer, microcell-specific service times are measured and the load in the macrocell M is monitored as described above. The microcell-specific percentage $P_n$ of the service times longer than the macrocell-specific threshold value R is calculated from microcell-specific service time distributions. The percentage $P_1$ of the mobile stations MS located within the service area of the microcell 1 but engaged with the macrocell M is handed over to the microcell 1, starting from the slowest mobile stations. When the load in the macrocell falls below the desired load level $L_{opt}$, the threshold service time R is increased and when the load exceeds the maximum load $L_{max}$, the threshold service time R is decreased. If the maximum traffic load in the microcell 1 was exceeded as a result of the handover, mobile stations are not handed from the macrocell M over to the microcell 1. With the handover method of the present invention, more mobile stations are handed over to microcells having larger service areas, for example to the microcell 2, than to smaller microcells 1 and 3, although the threshold service time R is common to all microcells 1, 2 and 3 in the area of the macrocell M.

The calculation and handovers in the method may also be carried out at specific intervals, for example. In the same microcell/macrocell environment the method of the invention can be applied to both directions, that is, for a handover from a microcell to a macrocell and for a handover from a macrocell to a microcell. In this case faster mobile stations are handed over to the macrocell and, correspondingly, slower mobile stations to the microcell.

The arrangement for carrying out the method of the invention is preferably embodied in association with handover decision making equipments, for example, in association with a base station controller BSC. The arrangement can also be distributed to different units of the system, for example by placing the means defining the service times in the base station BTS of the cell to be examined. The arrangement comprises registration means, timing means, calculation means and a handover control unit. Each cell is provided with dedicated means.

The drawings and the associated description are intended merely to illustrate the inventive concept. In its details the handover method of the invention in a mobile communication system of a multilayer radio coverage may be modified within the scope of the claims. Although the invention has been explained above primarily in association with a handover carried out from a microcell to a macrocell, the method is also applicable to handovers carried out in the opposite direction. The method is very well suited to be used even in CDMA mobile communication systems where cell sizes in the network are changed on the basis of traffic capacity.

What is claimed is:

1. A handover method in a mobile communication system of a multilayer radio coverage comprising a lower cell layer having at least one microcell (1, 2, 3) and a higher cell layer having at least one macrocell (M), the microcell (1, 2, 3) being at least mainly within the macrocell (M), the method comprising the steps of:

determining relative moving speeds of mobile stations (MS) in a first cell at the lower cell layer, and monitoring a traffic load in a second cell at the higher cell layer, characterized by further steps of:

determining the service times in the first cell at the lower cell layer, determining a percentage P of the number of the service times confined by a specific pre-set threshold service time R among a selected service time material, handing over the percentage P of all the mobile stations (MS) within the service area of the cell to be examined to the target cell in the order of the relative moving speed of the mobile stations, the cell to be examined being the first cell and the target cell being the second cell, or vice versa, and adjusting the pre-set threshold service time R to attain a desired traffic load level in the second cell at the upper cell layer.

2. A method according to claim 1, characterized in that said step of determining the service times of the first cell at the lower cell layer comprises the following steps:

measuring the service times in the service area of the first cell at the lower cell layer, and storing the service times into a continuously storing register.

3. A method according to claim 1, characterized in that said service time material comprises the service times determined during a specific time period.

4. A method according to claim 1, characterized in that said service time material comprises a specific number of the last determined service times.

5. A method according to claim 1, characterized in that when the target cell is the second cell at the higher cell layer and the cell to be examined is the first cell at the lower cell layer, said service times confined by the pre-set threshold service time R comprise the service times that are shorter than the threshold service time R, and the percentage P of the mobile stations (MS) to be handed over to the target cell comprise the fastest mobile stations (MS).

6. A method according to claim 1, characterized in that when the target cell is the first cell at the lower cell layer and the cell to be examined is the second cell at the higher cell layer, said service times confined by the pre-set threshold service time R comprise the service times that are longer than the threshold service time R, the percentage P of the mobile stations (MS) to be handed over to the target cell comprise the slowest mobile stations (MS), and the mobile stations (MS) are not handed over to the target cell if the pre-set maximum value of the traffic load in the target cell is exceeded.

7. A handover method from a microcell to a macrocell in a mobile communication system having a multilayer cell coverage comprising at least one microcell (1, 2, 3) and at least one macrocell (M), whereby the microcell (1, 2, 3) is within the macrocell (M), the method comprising steps of:

determining relative moving speeds of mobile stations (MS) in the service area of the microcell, and monitoring a traffic load in the macrocell (M), characterized by further steps of:

determining the service times in the microcell (1, 2, 3), calculating a percentage P of the number of the service times shorter than a specific pre-set threshold service time R among a selected service time material, handing over the percentage P of all the mobile stations (MS) within the service area of the microcell (1, 2, 3) to the macrocell (M) in the order of the relative moving speed, starting from the fastest mobile station (MS), and adjusting the pre-set threshold service time R to attain a desired traffic load level in the macrocell (M).

8. A method according to claim 7, characterized in that said step of determining the service times of the microcell (1, 2, 3) comprises the following steps:

measuring the service times in the service area of the microcell (1, 2, 3), and storing the service times into a continuously storing register.

9. A method according to claim 7, characterized in that said service time material comprises the service times determined during a pre-set time period.

10. A method according to claim 7, characterized in that said service time material comprises a pre-set number of the last determined service times.

11. A method according to claim 7, characterized in that said adjustment of the pre-set threshold service time R comprises increasing the threshold service time R when the load in the macrocell (M) is to be increased, and decreasing the threshold service time R when the load in the macrocell (M) is to be decreased.

* * * * *